United States Patent [19]

Simpson, Jr.

[11] 4,446,890
[45] May 8, 1984

[54] CONTINUITY ACTUATED ISOLATION VALVE ASSEMBLY

[75] Inventor: William E. Simpson, Jr., Chamblee, Ga.

[73] Assignee: Lockheed Corporation, Burbank, Calif.

[21] Appl. No.: 308,359

[22] Filed: Oct. 5, 1981

[51] Int. Cl.³ .............................................. F16K 17/10
[52] U.S. Cl. ..................................... 137/87; 137/464; 91/420; 91/421
[58] Field of Search .................... 137/87, 464; 91/420, 91/421; 60/403, 406

[56] References Cited

U.S. PATENT DOCUMENTS

| 2,744,533 | 5/1956 | Parker | 137/87 |
| 2,745,253 | 5/1956 | Towler et al. | 137/87 |
| 4,080,987 | 3/1978 | Fogg | 137/464 |

Primary Examiner—Martin P. Schwadron
Assistant Examiner—James R. Shay
Attorney, Agent, or Firm—John J. Sullivan

[57] ABSTRACT

A hydraulic isolation valve (10) will not open if leaks are present in the associated utility subsystem (15). The continuity of the hydraulic fluid circuit actuates the valve (10) to the open position by an energized solenoid operated pilot valve (21) sending a small flow through a fuse (23) and one-way restrictor (24) to the utility function (15). If no leaks are present, the utility function (15) begins to actuate sending return flow through a two-way restrictor (31) and moving a continuity actuation piston (28) to push the shut off spool (16) to the open position so that full flow is admitted to actuate the utility function (15). If the continuity of the hydraulic circuit is broken by leaks, the return flow does not reach the continuity actuation piston and the shut off spool (16) remains in the shut off position, the fuse (23) closing to block further flow and then resetting by spring action when the solenoid operated pilot valve (21) is deenergized so that actuation may be attempted again, if desired. The shut off spool (16) can be manually moved to open position by turning a manual override knob (33).

5 Claims, 3 Drawing Figures

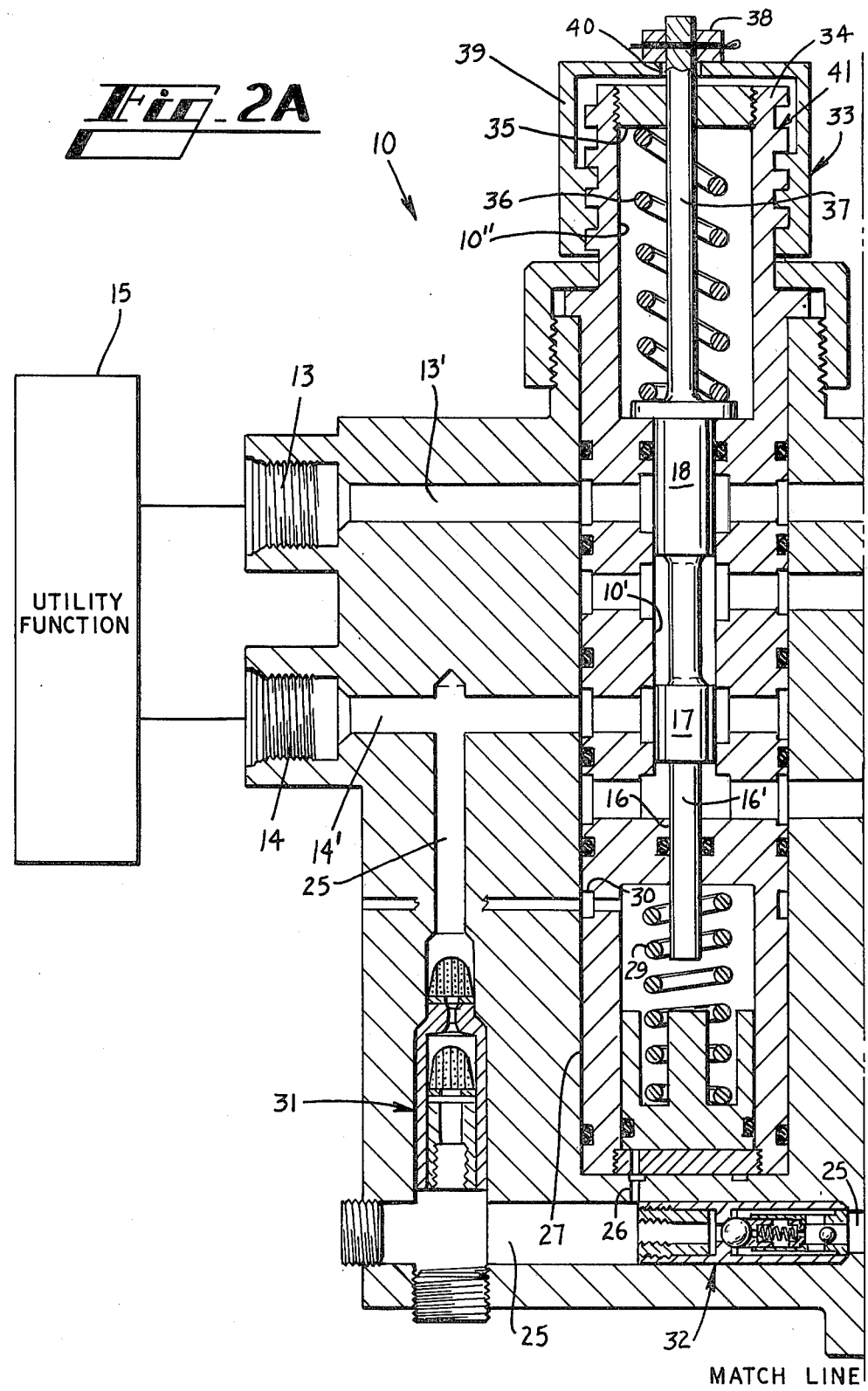

CONTINUITY ACTUATED ISOLATION VALVE ASSEMBLY

TECHNICAL FIELD

This invention relates to valves employed to regulate the flow of fluid and more particularly to a valve assembly which is actuated by the continuity of fluid flow through the entire system with which it is associated whereby a loss of fluid through leakage is prevented.

In some applications notably in hydraulic systems of aircraft it is not only desirable but imperative to prevent the loss of fluid due to leakage in the system at the earliest time. Catastrophic results are otherwise likely to occur.

BACKGROUND ART

Various control devices have been heretofore developed which regulate the supply of fluid to a utility function such as a hydraulic actuator or the like. These devices operate on a pressure sensing basis, i.e. they sense a loss of pressure and close so as to block the continued flow of fluid into, and a loss of fluid from, the system through the leaking area.

Such prior art devices are found in the following U.S. Pat. Nos.:
U.S. Pat. No. 1,045,693—Gillman
U.S. Pat. No. 2,426,212—Hedene
U.S. Pat. No. 2,871,876—Edmund
U.S. Pat. No. 3,295,420—Gleason et al
U.S. Pat. No. 3,971,404—Quarve
U.S. Pat. No. 4,080,987—Fogg
U.S. Pat. No. 4,085,772—Roger
U.S. Pat. No. 4,145,025—Bergeron
U.S. Pat. No. 4,153,072—Thompson
U.S. Pat. No. 4,173,233—Snyder

DISCLOSURE OF INVENTION

In accordance with the present invention a small measured quantity of fluid is released or injected into the system and forced around the entire circuit. If no leaks are present this fluid is allowed to return to actuate the valve to open so that the full fluid flow is admitted to the utility function. Alternatively, if a leak exists in the system the injected fluid does not return and the valve remains closed and fluid is thereafter not available to the utility function for its operation.

Thus, unlike prior art devices the valve assembly herein proposed minimizes the loss of system fluid through leakage, i.e. only the small measured quantity. Moreover, there is no requirement to wait for a pressure drop in the system to close the valve and block further drain of the full fluid flow as in the presently designed devices.

More specifically, the present valve assembly includes a first fluid pressure port and a first fluid return port on one side, each adapted to be connected to a source of fluid under pressure. A second fluid pressure port and a second fluid return port is located on another side of the valve assembly, each adapted to be connected to the utility function or hydraulic system. Mounted between these ports is a reciprocable valve stem and biasing means to normally retain it in a position blocking communication between all of the ports.

Valving, i.e. a valve arrangement is connected between the first and second fluid pressure ports which is operative when actuated to momentarily open and then close whereby a predetermined amount of pressurized fluid is released therethrough and into the hydraulic system. A fluid return passage is connected between the first and second fluid return ports and a normally inoperative, fluid-actuated piston is connected to the valve stem to move it when operative in opposition to the biasing means. The valve stem is thereby moved out of its normal position and to a position where it establishes communication between the first and second fluid pressure ports and simultaneously between the first and second fluid return ports. A spur passage connected between the fluid return passage and the piston serves to provide fluid for actuation of the piston when fluid is available from the hydraulic system.

BRIEF DESCRIPTION OF DRAWINGS

The details of the present invention will be described in connection with the accompanying drawing, wherein FIGS. 2A, 2B is a similar section to show the actual construction of the valve assembly schematically shown in FIG. 1 and its relation to the utility function illustrated symbolically.

BEST MODE FOR CARRYING OUT THE INVENTION

Figure 1:
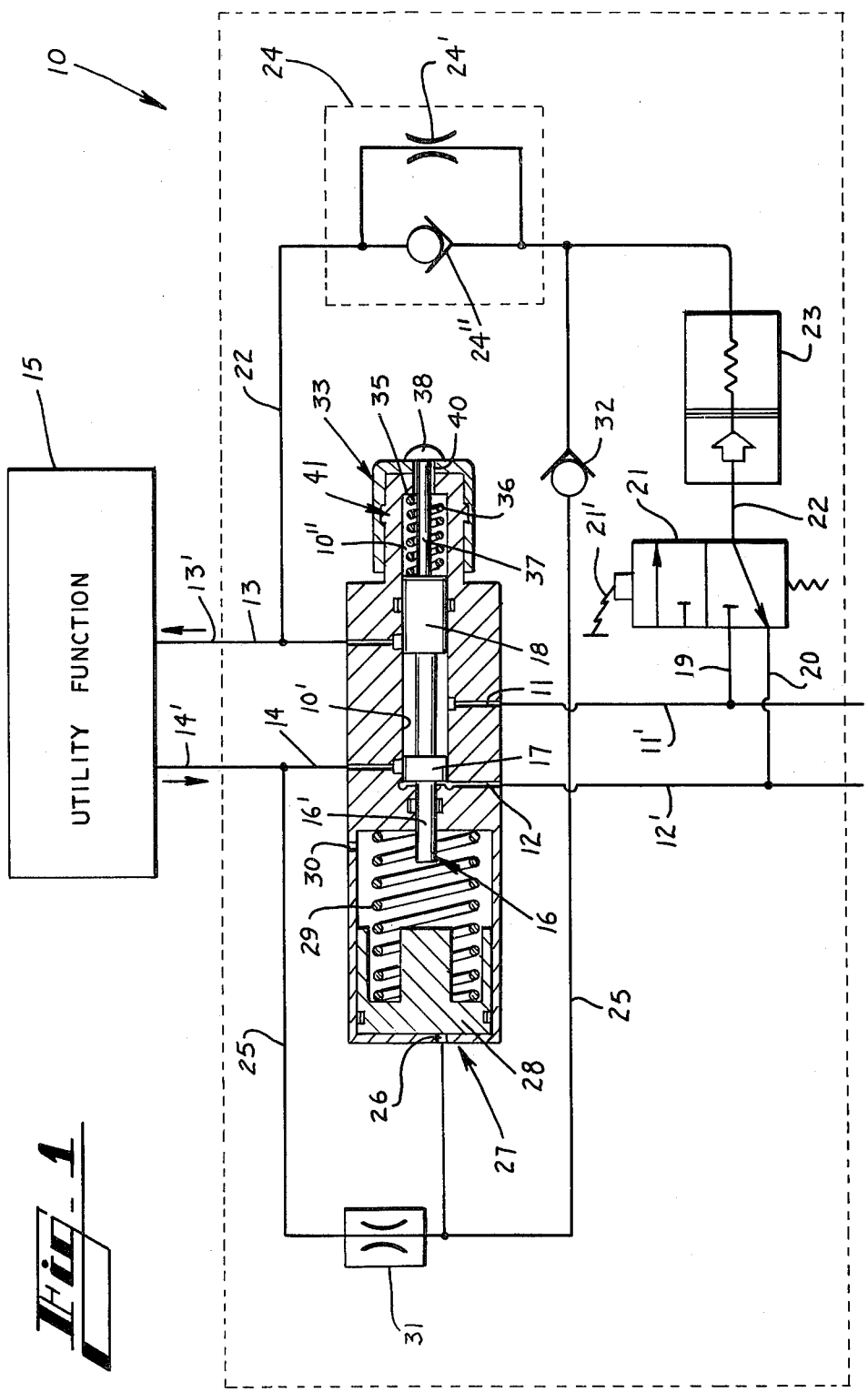
FIG. 1 is a schematic of the valve assembly is shown which includes a longitudinal section taken therethrough showing the associated fluid control means for the operation of the valve and by which it is operatively interconnected with the utility function.
Figure 2B:
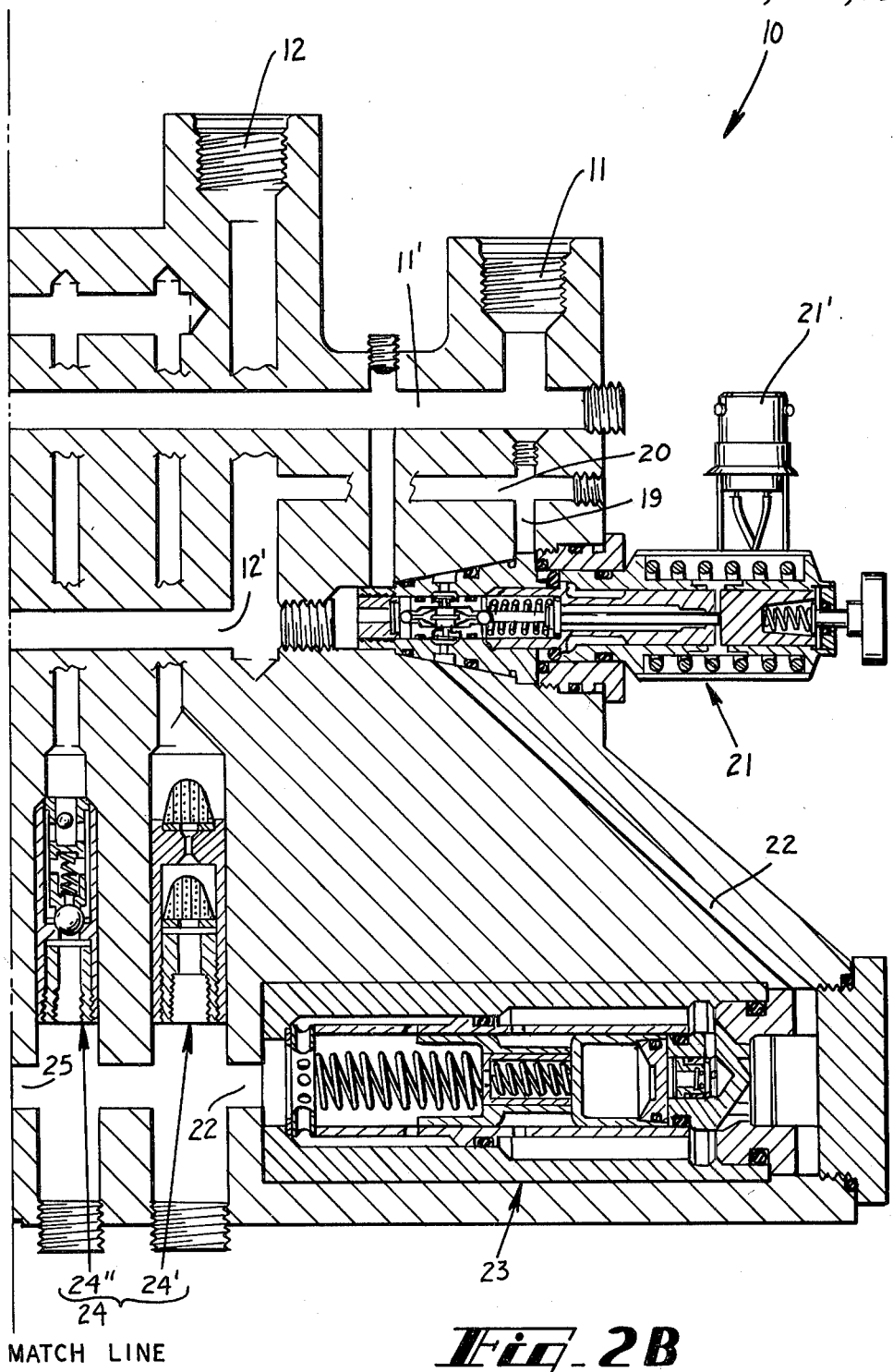

Referring more particularly to the drawing 10 designates a valve assembly as proposed herein.

The valve body of this assembly 10 is provided with a pressure port 11 and a return port 12 adapted for connection through passages 11' and 12' respectively from and to a source of pressurized fluid (not shown). The valve body is also provided with apressure port 13 and a return port 14 adapted for connection through passages 13' and 14' respectively to and from a utility function indicated generally at 15.

Mounted internally of the valve body between the ports 11 and 12 on one side and the ports 13 and 14 on the other side is a spool stem 16 adapted to reciprocate in an axial bore 10'. This spool stem 16 has a pair of spaced lands 17 and 18 normally disposed adjacent and blocking the ports 13 and 14. In this normal position the pressure port 11 from the hydraulic fluid source opens internally of the valve body into the bore 10' between the lands 17 and 18.

Fluid spur passages 19 and 20 connect the passages 11' and 12' respectively to a solenoid operated pilot valve 21 which in turn connects to the passage 13' through a passage 22. Located in the passage 22 are a hydraulic fuse 23 spring-actuated to close and a one-way restrictor 24 to permit fluid flow when the valve 21 is actuated by its solenoid 21' from the pressure source to the utility function through its check element 24" and to limit flow in the reverse direction by its restricting element 24'.

A fluid spur passage 25 connects return passage 14' to the passage 22 between the fuse 23 and restrictor 24 as well as to an inlet port 26 to a cylinder 27 adjacent one end of the valve body. Internally the cylinder 27 houses a piston 28 mounted for reciprocation therein and normally held in a position remote from the valve stem 16 by a compression spring 29. An extension 16' on the valve stem 16 extends beyond the wall of the valve body and into the cylinder 27 a distance sufficient to allow its movement inwardly of the valve body to unseat the lands 17 and 18 from ports 13 and 14. This is accomplished by movement of the piston 28 in opposition to the spring 29 under the force of fluid pressure in return passage 14', passage 25 and inlet port 26. A vent 30 in the wall of the cylinder 27 adjacent the inner end thereof permits such piston movement. A restriction 31 is operatively connected in the spur passage 25 between the return passage 14' and port 26 and a check valve 32 in the passage 25 between the port 26 and the passage 22 to control the fluid flow following conventional practice.

On the opposite end of the valve element is a manual control or override knob 33 to permit the intentional hand movement of the valve stem 16 when desired. To this end an extension 34 is provided on the end of the valve body opposite from the cylinder 27. The extension 34 has an internal axial bore 10" aligned with the valve bore 10' forming a continuation thereof to accommodate the land 18 upon reciprocation of the valve stem 16. At its outer end the axial bore 10" terminates in an abutment or stop 35 against which one end of a compression spring 36 is adapted to abut in opposition to its other end against the side surface of the land 18.

An axial rod 37 is provided on the outer end of the valve stem 16 extending from the land 18 through the spring 36 and terminating in an enlarged head 38 beyond the end of the extension 34. The bottom wall of a cup shaped sleeve 39 is sandwiched between the wall of the extension 34 and the head 38 passing through an opening 40 provided therein. The sleeve 39 encloses the extension 34 in substantially surface to surface contact being rotatable thereon through a cam and groove engagement 41 between the adjacent surfaces of the walls of the extension 34 and sleeve 39.

OPERATION OF THE PREFERRED EMBODIMENT

The control valve within the utility function 15 and the solenoid operated pilot valve 21 are energized simultaneously. Energizing the solenoid operated pilot valve 21 momentarily establishes communication between the hydraulic pressurized fluid source through passages 11', 19 and 22 into the fuse 23. The pressurized fluid acting on the fuse 23 moves the piston therein against its spring releasing or ejecting fluid into and through the check element 24" only of the oneway restrictor 24 for eventual circulation through the utility function 15.

If there are no leaks, the utility function 15 will actuate sending a return fluid flow into passages 14' and 25 through the two way restrictor 31. Fluid then passing through the port 26 acts on and against piston 28 compressing the spring 29 whereby the piston 28 pushes against the extension 16' to move the valve stem 16 to the open position. Full fluid flow is thereby permitted through port 11, valve bore 10', port 13, passage 13' and into the utility function 15 for the operation thereof. Once the valve is thus opened the continued pressure of return fluid in passage 25 and through port 26 acts on and against the piston 28 which holds the valve stem 16 and maintains the valve in the open position.

If on the other hand the continuity of the hydraulic circuit through the utility function 15 is broken by leaks, the return fluid flow does not reach the piston 28, the valve stem 16 remains in the shut-off position and the fuse 23 resets by spring action so that the operation may be attempted again, if desired.

If desired, the valve stem 16 can be manually moved to the open position. This is accomplished by rotating the sleeve 39 and causing it to move along the cam and groove engagement 41 exerting an outward force on the rod head 38. This force is sufficient to overcome the normal action of the spring 36 compressing it and displacing the lands 17 and 18 with respect to the ports 13 and 14.

When the control valve in the utility function 15 is deenergized (closed), actuation of the utility function 15 ceases and the pressure of return fluid against piston 28 ceases. At this time the spring 29 pushes piston 28 away from the extension 16' allowing the spring 35 to push the valve stem 16 to the position where the land 18 blocks pressure port 18 and the land 17 blocks return port 14.

When it is intended that the valve assembly 10 maintain blockage of flow to the utility function 15, the check valve 32 and the restricting element 24' of the one-way restrictor 24 prevent thermal expansion of fluid building up pressure in the utility function 15, by venting, the expanded fluid back to the return port 12 through passages 22 and 20.

I claim:
1. A valve assembly to control the flow of fluid to a utility function comprising:
   a first fluid pressure port and a first fluid return port on one side of said valve assembly, each connected to a fluid source;
   a second fluid pressure port and a second fluid return port on another side of said valve assembly, each connected to said utility function;
   a reciprocable valve stem mounted between said first and said second ports;
   biasing means operative on said stem normally retaining it in a position blocking communication between all of said ports;
   a valve arrangement connected between said first and second fluid pressure ports and operative when actuated to open momentarily and then close to thereby release a predetermined amount of fluid therethrough and into said utility function;
   a fluid return passage connected between said first and second fluid return ports;
   a normally inoperative, fluid-actuated piston connected to said valve stem to move it when operative in opposition to said biasing means out of its normal position aforesaid to establish communication between said first and second fluid pressure ports and between said first and second fluid return ports; and
   a spur fluid passage between said fluid return passage and said piston for the actuation of said piston by pressure in said fluid return passage.

2. The valve assembly of claim 1 including a cam and groove engagement operative on said stem in opposition to said biasing means for the manual release and retention thereof in the released position whereby communication is established between said first and second fluid pressure ports and between said first and second fluid return ports.

3. The valve assembly of claim 1 wherein said valve arrangement includes a pilot valve and a hydraulic fuse and a one-way restrictor connected in series.

4. The valve assembly of claim 3 wherein said one-way restrictor includes a check element and a restricting element connected in parallel.

5. The valve assembly of claim 1 wherein said piston is slideably mounted in a cylinder at one end of said valve assembly and said biasing means is a compression spring mounted in an extension at the opposite end of said valve assembly and including a manually operated control to compress said spring.

* * * * *